United States Patent Office 3,457,277
Patented July 22, 1969

3,457,277
PROCESS FOR THE PREPARATION OF VICINAL EPISULFIDES
Stephen W. Osborn, Yardley, Pa., and Jose L. Villa, Hightstown, N.J., assignors to Thiokol Chemical Corporation, Bristol, Pa., a corporation of Delaware
No Drawing. Filed Aug. 5, 1965, Ser. No. 477,595
Int. Cl. C07d 59/00; C08g 23/00
U.S. Cl. 260—327                    13 Claims

ABSTRACT OF THE DISCLOSURE

Vicinal episulfides may be prepared in high yield from the corresponding alkylene oxide and a sulfur-donor, such as carbonyl sulfide or carbon disulfide, by passing a gaseous mixture of the alkylene oxide and the sulfur-donor through an inert organic solvent in which there is dissolved a catalytic amount of a Lewis base, using temperatures in the range from about 100° C. to about 300° C. By incorporating a small amount of a halogen-containing organic compound or free halogen in the inert organic solvent containing the Lewis base, it is possible to reduce and even to eliminate any tendency of the vicinal episulfide to undergo polymerization.

---

This invention relates to a process for the preparation of vicinal episulfides and more particularly relates to such a process which involves the reaction of an alkylene oxide with certain sulfur donating compounds using certain basic catalysts whereby said catalysts are in solution so as to form a liquid catalyst bed through which the reactant gases are passed.

It is an object of the present invention to provide a novel process for the preparation of vicinal monoepisulfide compounds.

A further object of the present invention is to provide a novel, liquid bed catalyst system for the preparation of vicinal monoepisulfide compounds.

A still further object of the present invention is to provide a novel liquid bed catalyst system for the production of vicinal episulfide compounds which comprises a very small amount of a Lewis base which is dissolved in an organic solvent to form an exceptionally economical and convenient to use catalyst system.

Vicinal monoepisulfides are a class of heterocyclic sulfur-containing compounds which may be represented by the structure

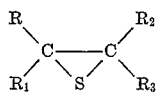

wherein R, $R_1$, $R_2$, and $R_3$ may be the same or different and may be H, an aryl group, or a lower linear or cyclic alkyl radical containing 1 to about 10 carbon atoms. These materials are also commonly referred to as alkylene sulfides. Examples of such compounds include monomeric materials such as ethylene sulfide, propylene sulfide, 1,2- and 2,3-butylene sulfide, isobutylene sulfide, styrene sulfide and cyclohexene sulfide. These compounds may be polymerized to form elastomers or moldable thermoplastic polymers which are used in a variety of molded articles such as pipe, O-rings, gears and the like. See in this regard S.N. 165,034 filed Jan. 8, 1962, S.N. 168,836 filed Jan. 25, 1962 and S.N. 274,866 filed Apr. 22, 1963 in the names of Riad H. Gobran and Stephen W. Osborn. Furthermore, certain of these monomeric vicinal episulfides exhibit utility, without further structural modifications, as insecticides and fungicides. See in this regard U.S. 2,225,573.

Durden et al., in the Journal of Organic Chemistry 26, 836 (1961) report the preparation of ethylene sulfide and propylene sulfide by reacting the corresponding vic-epoxide analogs, i.e., ethylene oxide and propylene oxide, with carbonyl sulfide in a solid catalyst bed vapor phase reaction in the presence of a lithium phosphate catalyst.

The preparation of a vicinal episulfide, e.g. ethylene sulfide, by the solid catalyst bed vapor phase reaction of an alkylene oxide, e.g., ethylene oxide, with certain sulfur-containing compounds, e.g., COS, $CS_2$, or $H_2S$, using certain halide and oxygen containing catalysts is disclosed in S.N. 370,331 filed May 26, 1964, now abandoned and S.N. 375,271 filed June 15, 1964 in the U.S. Patent Office.

One of the big problems with this solid catalyst bed reaction is the large amount of catalyst required to produce a given amount of vicinal episulfide product. The solid catalyst bed has a relatively short life due to the formation of by-products that contaminate the catalyst as the process proceeds and the amount of catalyst needed to produce a given amount of episulfide product is very high. Therefore, the catalyst cost may make the process uneconomical as a source of vicinal episulfide. Attempts have been made to regenerate the catalyst. Such attempts have not provided a satisfactory solution to the problem because of low yields or complete failure of the catalyst system after a few regenerations. It has now been unexpectedly found that a catalytically induced process for making vicinal episulfides in excellent yields by the reaction of a sulfur-donating compound with an alkylene oxide compound may be very readily carried out using relatively very small amounts of catalyst by using a novel liquid catalyst system wherein the catalyst system comprises a Lewis base dissolved in an organic solvent. The novel liquid catalyst system of the present invention not only uses relatively very small amounts of the catalyst, but it has been unexpectedly found that polymerization of the vicinal alkylene sulfide can be prevented and the catalyst life in this liquid system may be substantially lengthened by addition of free-halogen or a halogenated organic compound to the novel liquid system.

The novel liquid catalyst bed process of the present invention has the advantage of lower catalyst costs, substantially greater convenience and higher conversion levels than the gas-solid catalyst systems heretofore used. The lower catalyst costs of the liquid bed system are due primarily to the fact that a much smaller amount of catalyst is used for a given amount of reactant gases. Furthermore, the organic solvent of the present catalyst system can be recycled and reused. Moreover, due to the relatively small amount of catalyst used in the process per given amount of reactant gases, it has not been found necessary to regenerate the catalyst. Although such regeneration of the catalyst may be performed where desired.

The catalytic compounds which may be utilized in the catalyst system of the present invention are compounds which will act as a Lewis base or compounds which will furnish a Lewis base under the reaction conditions of the novel process of the present invention. These compounds must be at least partially soluble in an organic solvent which will not interfere adversely with the reaction. Solubility of the catalyst is a function of temperature, pressure, nature of the catalytic compounds, nature of the organic solvent, and other factors known to one skilled in the art.

The catalytic compounds which may be used in the catalyst system of the present invention include metal halides of Mendeleev Periodic Table [1] Groups I-A and ---
[1] The periodic table referred to is the Mendelee Table printed in Lange's Handbook of Chemistry, Ninth Edition, McGraw-Hill, 1956, pp. 56–57.

II-A metals, and of certain groups II-B and VIII metals i.e.—the halide of lithium, sodium, potassium, rubidium, cesium, beryllium, magnesium, calcium, strontium, cobalt, and cadmium. The hydroxides of the Mendeleev Periodic Table Groups I-A, II-A, III-A, II-B, and VIII metals may also be utilized in the catalyst system of the present invention in conjunction with an elemental halogen to form the metal halide in situ. In general the system $MOH+X_2$ is used where M is any Group I-A and II-A metal or certain groups, II-B and VIII metal and X is chlorine, bromine or iodine. Thus the metal halide is formed as follows:

$$2MOH+X_2 \rightarrow 2MX+H_2O+\tfrac{1}{2}O_2$$

Specific examples are: $KOH$ used with $I_2$, $CaOH$ used with $Br_2$, and $NaOH$ used with $Cl_2$.

Other catalytic compounds which are suitable for use in the novel process of the present invention are the metal hydroxides of the Group I-A, II-A, III-A, II-B and VIII metals. Specific hydroxides of this type are the hydroxides of lithium, sodium, potassium, ribidium, cesium, beryllium, magnesium, calcium, strontium, boron, aluminum, iron, cobalt, nickel, ruthenium, rhodium, palladium, zinc, cadmium, and mercury.

Other oxygen containing compounds which may also be used in the catalyst system of the present invention include the metal oxides and alkoxides of the Group I-A, II-A, III-A, IV-A and VIII metals. Specific compounds which may be used according to the present invention in this regard include: alkali metal oxides such as $Li_2O$, $Na_2O$, $K_2O$, $Rb_2O$ and $Cs_2O$; alkali metal alkoxides such as $NaOCH_3$, $LiOCH_3$, $NaOC_2H_5$, $NaOC_6H_5$, and $LiOC_6H_5$; alkaline-earth metal oxides such as $MgO$, $CaO$, $SrO$ and $BaO$; boron oxides, such as $B_2O_3$; aluminum oxides, such as, $Al_2O_3$; aluminum alkoxides such as, $Al[OCH(CH_3)_2]_3$ and $Al[OC(CH_3)_3]_3$; silicon oxides, such as $SiO_2$; iron oxides, such as $Fe_2O_3$; nickel oxides, such as, $NiO$; and copper oxides such as $CaO$. The alkoxides may be defined generally by the formula: $M(OR)_n$ where M is the metallic constituent, R is a lower alkyl group of from about 1 to about 4 carbon atoms, and $n$ is the valence of M.

Other catalysts which may be used are Groups I-A, II-A and III-A metal salts of organic carboxylic acids and phenols. These would include the Groups I-A, II-A and III-A acetates, oxalates, benzoates, laurates, phenates, salicylates, naphthoates, cinnamates, lactates and succinates.

Also suitable for catalysts are the Groups I-A, II-A, and III-A metal phosphates, borates, cyanates, thiocyanates, fluosilicates, iodates, molybdates, thiosulfates, cyanides, silicates, titanates, aluminates, stannates, sulfides, and tungstates. Specific examples of such compounds are: $Na_3PO_4$, $NaH_2PO_4$, $Na_2HPO_4$, $Ca(BO_2)_2$, $NaCNO$, $NaCNS$, $CaSiF_6$, $KIO_3$, $Na_2MoO_4$, $K_2S_2O_3$, $KCN$, $Na_2Si_2O_5$, $K_2Ti_3O_7$, $NaAlO_2$, $K_2SnO_3$, $Na_2S$ and $Na_2WO_4$.

Also suitable as catalysts in the process of the present invention are the Groups I-A, II-A and III-A metal salts of carbonic and thiocarbonic acids and their alkyl esters. Included among these compounds are the Groups I-A, II-A and III-A metal monothiocarbonates such as $NaSCO_2R$; dithiocarbonates such as $KSCSOR$; trithiocarbonates such as $LiSCSSR$; and other compounds such as $Na_2SCO_2Na$, $NaSCSONa$, $NaSCSSNa$, $NaOCONa$, $Na_2CSO_2$, $Na_2CS_2O$, and $Na_2CS_3$.

Basic amine compounds may also be used in the catalyst system of the present invention and they include, for example, triethanolamine, triethylamine, n-butylamine, tert-butylamine, tripropylamine, and trimethylenediamine.

Quaternary ammonium salts may also be used as catalysts in the catalyst system of the present invention. Specific examples are compounds such as tetraethylammonium iodide, the iodide salt of chlorine, chloride, and hexamethylenetetramine ethiodide.

In conducting the process of the present invention, the catalyst system comprises a catalyst which is dissolved in a solvent such as tetraethylene glycol dimethyl ether. The preferred catalyst is an alkali metal halide such as KI or LiCl due to higher yields obtained. The catalyst bed to be used with this catalyst may be prepared directly by dissolving KI or LiCl crystals in the solvent. An equally preferable method for obtaining the preferred KI catalyst system is by adding stiochometric quantities of potassium hydroxide and iodine crystals to the solvent to form the KI in situ. Thus, KI is formed as follows:

$$2KOH+I_2 \rightarrow 2KI \pm H_2O + \tfrac{1}{2}O_2$$

For practical, as well as economical reasons, more than one of the disclosed catalytic compounds may be effectively utilized at one time in the catalyst system in accordance with the present invention.

The catalyst in the organic solvent should be present in catalytic amounts. What is a catalytic amount for a particular compound will vary according to its solubility in the particular solvent chosen, temperature of the catalyst bed, nature of the compound, and other factors known to one skilled in the art. The amount of catalyst dissolved in organic solvent may vary from about 0.05% to 10% and preferably from about 0.2% to 1% by weight of the inert organic solvent. It may be desirable in certain cases to form a slurry of the catalyst and solvent wherein a large amount of catalyst is present in the system in the undissolved state.

The alkylene oxides which may be used according to the present invention to form the analogous alkylene sulfides may be represented by the structure

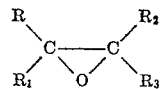

where R, $R_1$, $R_2$ and $R_3$ may be the same or different and may be H, an aryl group or a lower linear or cyclic alkyl group of from 1 to about 10 carbon atoms, depending on the desired alkylene sulfide product. Examples of such alkylene oxides are ethylene oxide, propylene oxide, 1,2- and 2,3-butylene oxide, isobutylene oxide, styrene oxide and cyclohexane oxide. Additionally, the alkylene oxide must be a material which is capable of being converted to and/or maintained in the gaseous phase at the reaction temperature and pressure involved in the process.

The sulfur-containing compound which is reacted with the alkylene oxide according to the present invention should be a material which is a sulfur donating compound. It should also be a material which will exist in a vapor state at the reaction conditions employed in the process of the present invention or which will dissolve in the catalyst system of the present invention. These materials do not affect the acidity of an aqueous solution and should be materials which may be organic or inorganic in nature and would include such materials as $COS$ and $CS_2$. A composition containing large amounts of one or more of such sulfur-donating materials may be used in lieu of the pure material itself provided that the residual components of such a composition are inert to the reaction system. The sulfur donating materials may be used alone or in combination with one another. The preferred of such sulfur-containing materials is COS since, with it, the best yields and conversions are obtained, all other factors remaining the same.

Although the reaction will proceed when the mole ratio of sulfur-donating compound to alkylene oxide is in the order of from about 0.2:1 to about 10:1, it is preferable that the ratio of sulfur-donating compound to alkylene oxide be from about 0.8:1 to about 1.5:1. It is also preferable where the sulfur donating compound contains only one sulfur atom that an excess of sulfur-donating compound over alkylene oxide be utilized to prevent or reduce to a practical minimum the formation of alkylene oxide polymers since the predominating number of molecules of the sulfur-donating compound will enhance or increase the probability of reaction between such compounds and the alkylene oxide rather than the epoxide polymerization reaction. Where the sulfur donating compound contains two sulfur atoms an excess of the alkylene oxide should be used.

The catalyst system of the present invention may be contacted with the reactants by any of the common gas-liquid contacting techniques which are usually used by those in the art.

The reaction of the present invention is carried out in an organic solvent and preferably in a polar organic solvent. The organic solvent is one which will dissolve the catalyst and not substantially interfere with the desired course of the reaction, but the solvent may coact with the catalyst to give an improved catalyst system. Best results are obtained by the use of a polar organic solvent such as, for example, tetramethylene glycol dimethyl ether. The effectiveness of the solvent is directly related to the ability of the solvent to dissolve the particular catalyst used. The solvent chosen for use with a particular catalytic compound will depend upon the nature of the catalytic compound and other factors known to one skilled in the art. Examples of solvents which may be used in the invention are polyglycols such as tetramethylene glycol dimethyl ether, polyalkylene glycols such as polyethylene glycol, polythioether glycols such as thiodiethylene glycol, cyclic sulfones such as tetramethylene sulfone, alkyl carbitols such as butyl carbitol, aliphatic formamides having at least ten carbon atoms in the aliphatic chain, alkyl Cellosolves such as n-hexyl Cellosolve, and esters of aromatic carboxylic acids such as diethyl phthalate, and distilled petroleum hydrocarbons such as deodorized kerosene.

The process of the present invention will proceed over a wide range of pressures with a useful range of from about 5 millimeters of mercury up to atmospheric or autogenous pressures and a preferable range of from about 400 to about 760 millimeters of mercury. It has now been found that the reaction will proceed over a wide range of temperatures although a useful range of from about 100° C. to about 300° C. may be utilized advantageously and a temperature range of from about 180° C. to 220° C. is preferable. When the temperature range exceeds 300° C. the alkylene oxide reactant and alkylene sulfide product tend to interact or polymerize and/or a general degradation of the compounds involved results. Furthermore, the boiling point of the solvent is a further limitation on the temperature since the solvent should be in the liquid state, and generally above 300° C. most workable solvents are gaseous.

In the practice of the present invention it has also been unexpectedly found that the addition of a catalytic amount of a halogenated organic compound or free halogen to the catalyst system reduces or eliminates the polyethylene sulfide by-product yield. Therefore, a preferred modification of the present invention involves the addition of free halogen or a halogenated organic compound to the reaction system in the amount of about 1% or less by weight of the total catalyst system of the present invention.

Specific examples of such halogens and halogenated organic compounds are: free halogens such as chlorine, bromine, and iodine; halogenated aromatic compounds such as hexachlorobenzene and chlorinated diphenyl; alkyl, alkenyl, or alkynyl halides such as brominated butane, chlorinated ethylene, and iodinated methylacetylene; halogenated aldehydes and ketones such as phosgene; and acyl halides such as acyl chloride and bromoacetyl bromide.

These halogen containing compounds should be relatively neutral in the catalyst system, since it has been found that compounds which contain strong acidic or basic functions, such as —COOH, —SO$_3$H, and —NH$_2$ are not effective halogen containing compounds for the above described purpose because of the tendency of such strongly acidic or basic compounds to polymerize certain of the reactants and/or reaction product of the present invention. Hexachlorobenzene is a preferred additive to the catalyst system because of the very low by-product formation when it is added to the catalyst system.

In the following examples mole percent conversion has been used as a means of comparing yields from the different processes of the present invention. Mole percent conversion of ethylene oxide in the input gas stream to ethylene sulfide in the output or effluent gas stream was calculated as an approximation because of the unknown amount of ethylene oxide in the input gas stream which ended up in by-product formation which showed up as a weight increase in the catalyst bed. This calculation was made by determining, from the gas chromatograph, the mole fraction of ethylene oxide and of ethylene sulfide in the effluent gases. The mole percent conversion of ethylene oxide input to ethylene sulfide output was calculated by dividing the mole fraction of ethylene sulfide in the effluent gases by the sum of the mole fractions of ethylene sulfide and ethylene oxide in the effluent gases, and then multiplying by 100.

The following examples are merely illustrative of the present invention and are not to be considered a limitation upon the scope thereof.

EXAMPLE 1

An apparatus was set up comprising a wash bottle reaction flask approximately 8½ inches high and 2½ inches in diameter, an inlet tube extended into a liquid catalyst bed, and outlet tube, a magnetic stirrer and an electric heating tape wrapped around the wash bottle controlled by a voltage regulator, known as a Variac. Flow rate meters were coupled between the gas sources and the chamber for mixing the reactant gases in order to measure the gas reactant flow. The outlet tube was connected with a gas chromatograph in order to sample and analyze the emerging gases. The wash bottle was charged with 130 grams of tetraethylene glycol dimethyl ether, 100 milligrams of KOH, and 200 milligrams of iodine crystals to give a catalyst bed approximately 2¼ inches in height. The liquid catalyst bed, forming a clear solution was heated to a temperature of about 200° C. while passing carbonyl sulfide (COS) gas through the catalyst bed. The reactant gases, carbonyl sulfide and ethylene oxide (EO), were introduced into the reaction chamber in a mole ratio of about 2:1 (COS/EO). The flow rate of the ethylene oxide was adjusted to a constant rate of 88 cc./min. A gas chromatographic analysis of the emerging gases gave the following results:

| Time (hrs.) | Percent CO$_2$ | Percent [1] COS | Percent EO | Percent ES | Mole Percent Conversion |
|---|---|---|---|---|---|
| 1 | 4.83 | 58.00 | 26.28 | 10.88 | 23.26 |
| 2 | 8.43 | 61.33 | 18.60 | 11.63 | 31.38 |
| 4 | 12.40 | 58.70 | 19.00 | 9.95 | 27.68 |

[1] Percentages are weight percent.

No ethylene sulfide polymer was observed in the liquid phase. The liquid phase had a weight increase of 7 grams (14% based on the ethylene oxide input).

The above procedure was followed except for a change in the temperature to 100° C. Gas chromatographic samples of the effluent gas showed traces of ethylene sulfide.

EXAMPLE 2

The apparatus described in Example 1 was charged with 130 grams of tetraethylene glycol dimethyl ether, 1 gram of KI, and traces of chlorine gas to give a liquid bed of about 2¼ inches height. The temperature of the liquid bed was raised to 200° C. The reactant gases, carbonyl sulfide and ethylene oxide, were introduced into the reactor chamber in a mole ratio of about 2:1 (COS/EO)

and the flow rate of the ethylene oxide was adjusted to a constant rate of 88 cc./min. A gas chromatographical analysis of the emerging gases gave the following results:

| Time (hrs.) | Percent $CO_2$ | Percent COS | Percent EO | Percent ES | Mole Percent Conversion |
|---|---|---|---|---|---|
| 1 | 6.04 | 55.63 | 26.60 | 11.72 | 24.40 |
| 2 | 14.95 | 48.83 | 23.25 | 12.96 | 29.03 |
| 4 | 15.90 | 45.22 | 24.73 | 14.14 | 29.48 |
| 6 | 16.01 | 45.55 | 14.59 | 14.59 | 30.99 |

Traces of ethylene sulfide polymer were observed in the liquid phase (less than 1 gm.), which had a weight increase of 7.4 gms. (12% based in the ethylene oxide input).

EXAMPLE 3

An apparatus was set up comprising a wash bottle approximately 8½ inches high and 2½ inches in diameter, an inlet tube extended into a liquid bed, an outlet tube, a magnetic stirrer, and an electric heating tape wrapped around the wash bottle controlled by a voltage regulator. Flow rate meters were coupled between the gas sources and the chamber for mixing the reactant gases in order to measure the gas reactant flow. The outlet was connected with a gas chromatograph in order to sample and analyze the emerging gases. The wash bottle was charged with 97 grams of tetraethylene glycol dimethyl ether, and 3 grams of sodium phenate was dissolved therein. The liquid bed was heated to a temperature of approximately 200° C. The reactor gases, carbonyl sulfide and ethylene oxide, were introduced into the heated reactor chamber in a mole ratio of about 2:1. The flow rate of the ethylene oxide was adjusted to a constant rate of 88 cc./min. The experiment was allowed to proceed for 3¼ hours. A gas chromatographic analysis of the emerging gases showed ethylene sulfide to be present in the amount of 3–4%. The reaction chamber had a weight increase of 17.0 grams. What was believed to be ethylene sulfide polymer was observed in the liquid bed as a white precipitate.

EXAMPLE 4

The apparatus described in Example 1 was charged with 150 grams of tetramethylene sulfone, and 11.55 grams of sodium fluoride as a fine powder was dissolved therein. The liquid bed was heated to a temperature of 200° C. and the reactant gases, carbonyl sulfide and ethylene oxide, were introduced into the reactor chamber in a mole ratio of about 2:1 (COS/EO). The flow rate of the ethylene oxide was adjusted to a constant rate of 88 cc./min. The experiment was carried out for 4½ hours. A gas chromatographic analysis of the effluent gases indicated the composition to be 1–2% ethylene sulfide. The liquid bed had a weight increase of 12.0 grams.

EXAMPLE 5

An apparatus described in Example 1 was charged with 117 grams of tetraethylene glycol dimethyl ether and 0.5 grams of water, and 13 grams of potassium iodide. The reaction parameters were the same as Example 1, i.e., reactant gases-ethylene oxide and carbonyl sulfide, temperature—200° C., mole ratio (COS/EO) 2:1; flow rate (EO) 88 cc./min.

The effluent gases analyzed by the gas chromatograph gave the following results:

| Time (hrs.) | Percent $CO_2$ | Percent COS | Percent EO | Percent ES | Mole Percent Conversion |
|---|---|---|---|---|---|
| 1 | 13.90 | 57.60 | 17.87 | 10.62 | 30.36 |
| 2 | 14.32 | 51.15 | 23.52 | 10.99 | 25.52 |
| 3 | 24.42 | 48.85 | 18.79 | 7.93 | 23.61 |
| 4 | 18.37 | 58.37 | 15.13 | 8.12 | 28.24 |

The liquid bed had a weight increase of 25 grams in 4 hours and 8 min.

EXAMPLE 6

An apparatus as described in Example 1 was charged with 125 grams of tetraethylene glycol dimethyl ether, and 5 grams of potassium iodide (3.84% KI) was dissolved therein. The reaction parameters were the same as in Example 1, i.e., reactant gases-ethylene oxide (EO) and carbonyl sulfide (COS); temperature—200° C.; mole ratio (COS/EO) 2:1; flow rate (EO) 88 cc./min. The gas chromatographic analysis of the effluent gases gave the following results:

| Time (hrs.) | Percent $CO_2$ | Percent COS | Percent EO | Percent ES | Mole Percent Conversion |
|---|---|---|---|---|---|
| 1 | 10.30 | 64.20 | 17.7 | 8.2 | |
| 2 | 12.30 | 62.65 | 15.36 | 9.64 | 31.43 |
| 4 | 14.40 | 65.9 | 18.4 | 3.10 | |

Ethylene sulfide polymer was observed in the liquid bed at the end of 4 hours. The liquid bed had a weight increase of 10.5 grams in 4 hours and 5 minutes.

EXAMPLE 7

An apparatus as described in Example 1 was charged with 60 grams of thiodiethyleneglycol having 15% by weight of NaI dissolved therein. The reaction parameters were: reactant gases carbonylsulfide and ethylene oxide; temperature of the catalyst bed—175° C.; mole ratio (COS/EO)—1.2/1; flow rate (EO)—120 cc./min. The gas chromatographic analysis of the effluent gases gave the following results:

| Time (hrs.) | Percent $CO_2$ | Percent COS | Percent EO | Percent ES |
|---|---|---|---|---|
| 1 | 64.57 | 27.32 | 2.36 | 6.45 |
| 2 | 63.51 | 27.68 | 2.36 | 6.45 |
| 3 | 26.56 | 52.28 | + | 10.29 |
| 5 | 32.65 | 47.62 | 8.98 | 10.75 |

+—unknown.

EXAMPLE 8

An apparatus as described in Example 1 was charged with 60 grams of polyethylene glycol of 200 molecular weight having 1.4% by weight of MgO dissolved therein. The reaction was carried out as in Example 1 with the following reaction parameters: reactant gases—carbonyl sulfide (COS) and ethyleneoxide (EO), temperature of the catalyst bed 175° C.; mole ratio (COS/EO)—1.2:1; flow rate (EO)—120 cc./min.

Analysis of the exit gases from the reactor by gas chromatograph gave the following results:

| Time (hrs.) | Percent $CO_2$ | Percent COS | Percent EO | Percent ES |
|---|---|---|---|---|
| ½ | 24.99 | 45.69 | 25.13 | 4.20 |
| 1½ | 29.85 | 44.78 | 21.32 | 4.04 |
| 3¼ | 30.02 | 44.67 | 21.68 | 3.03 |
| 7 | 27.772 | 38.58 | 29.01 | 4.67 |

The reactor weight had increased by 103 grams.

EXAMPLE 9

An apparatus as described in Example 1 was charged with 97 grams of tetraethylene glycol dimethyl ether having 3 grams of sodium salicylate dissolved therein. The reaction was conducted as in Example 1 with the following reaction parameters: reactant gases carbonyl sulfide (COS) and ethylene oxide (EO), temperature of the catalyst bed—175° C.; mole ratio (COS/EO)—1.2:1; flow rate (EO)—120 cc./min. Analysis of the exit gases by vapor phase chromatograph gave the following results:

| Time (hrs.) | Percent $CO_2$ | Percent COS | Percent EO | Percent ES | Mole Percent Conversion |
|---|---|---|---|---|---|
| 1 | 3.47 | 47.22 | 38.19 | 11.11 | 17.56 |
| 2¼ | 8.74 | 31.03 | 40.20 | 20.03 | 27.00 |
| 3 | 13.40 | 36.66 | 34.77 | 15.17 | 24.26 |
| 5 | 27.08 | 38.81 | 23.47 | 23.47 | 25.04 |

A white paste, presumably ethylene sulfide polymer, appeared in the liquid catalyst bed. The catalyst bed had a weight increase of 26.0 grams.

EXAMPLE 10

The apparatus described in Example 1 was charged with 200 grams of a $C_{12}$–$C_{14}$ tertiary-alkyl formamide having 1 gram of sodium methoxide dissolved therein. The reactant gases, propylene oxide (PO) and carbonyl sulfide (COS) were introduced into the reactant chamber, by first passing COS gas through a heated flask of PO thereby producing a gaseous mixture of PO and COS which was then passed through the reaction chamber which contained a liquid catalyst bed heated to a temperature of 200° C. The COS flow rate was adjusted to a constant rate of 176 cc./min. A gas chromatographic analysis of the effluent gases gave the following results:

| Time (hrs.) | Percent $CO_2$ | Percent COS | Percent PO | Percent PS |
|---|---|---|---|---|
| ½ | 14.2 | 40.1 | 38.6 | 7.1 |
| 3 | 26.9 | 43.0 | 26.8 | 4.2 |
| 4 | 35.0 | 58.4 | 39.2 | 4.1 |
| 5 | 35.5 | 42.0 | 19.9 | 2.5 |

EXAMPLE 11

The apparatus of Example 1 was charged with 130 grams of tetraethylene glycol dimethyl ether having 1 gram of cobalt iodide dissolved therein. The procedure of Example 1 was followed with the following reaction parameters: reactant gases—ethylene oxide (EO) and carbonyl sulfide (COS); temperature of the catalyst bed—200° C.; mole ratio of COS/EO—2:1; flow rate of ethylene oxide—88 cc./min. After a 2 hour run a gas chromatographic analysis showed that ethylene sulfide had been produced.

In another experiment, the same procedure as above was used with the only change being that 1 gram of cadmium iodide was substituted for the cobalt iodide. Analysis at the end of 2 hours showed the presence of ethylene sulfide in the exit gases.

In still another experiment, a substitution of 0.5 gram of choline chloride and 700 milligrams of iodide crystals was made for the cobalt iodide in the above procedure and ethylene sulfide was produced during a 5 hour run.

EXAMPLE 12

The apparatus of Example 1 was charged with 98 grams of deodorized kerosene having 2 grams of triethanolamine dissolved therein. The procedure of Example 1 was followed with the following reaction parameters: reactant gases—carbonyl sulfide (COS) and ethylene oxide (EO); temperature of the catalyst bed—175° C.; mole ratio (COS/EO)—1.2:1; flow rate of EO—120 cc./min. Analysis of the exit gases by gas chromatograph gave the following results:

| Time (hrs.) | Percent $CO_2$ | Percent COS | Percent EO | Percent ES | Mole Percent Conversion |
|---|---|---|---|---|---|
| 1 | 1.90 | 52.02 | 43.02 | 3.06 | 4.96 |
| 4 | 1.26 | 49.21 | 46.60 | 2.93 | 4.96 |
| 6 | 0.56 | 49.28 | 48.35 | 1.80 | 2.66 |

The catalyst bed had a weight increase of 2 grams at the end of 6 hours.

EXAMPLE 13

The apparatus described in Example 1 was charged with 130 grams of tetraethylene glycol dimethyl ether, 200 mgs. of iodine crystals, and 100 mgs. of calcium hydroxide. The reactant gases, carbonyl sulfide (COS) and ethylene oxide (EO) were introduced into the reactor and the procedure of Example 1 was followed with the following reaction parameters: temperature of the catalyst bed—200° C.; mole ratio of COS/EO—2:1; flow rate of ethylene oxide—88 cc./min. The gas chromatographic analysis of the effluent gases gave the following results:

| Time (hrs.) | Percent $CO_2$ | Percent COS | Percent EO | Percent ES | Mole Percent Conversion |
|---|---|---|---|---|---|
| 1 | 4.8 | 32.6 | 36.2 | 26.4 | 34.7 |
| 1½ | 5.4 | 39.4 | 39.4 | 16.9 | 24.0 |
| 2 | 5.2 | 39.1 | 33.1 | 20.5 | 30.7 |

After 2 hours the catalyst bed showed a weight increase of 5.3 grams.

EXAMPLE 14

The apparatus described in Example 1 was charged with 130 grams of tetraethylene glycol dimethyl ether having 1 gram of hexamethylenetetramine dissolved therein. The procedure of Example 1 was followed with the following reaction parameters: reactant gases—ethylene oxide (EO) and carbonyl sulfide (COS); temperature of the catalyst bed—200° C.; mole ratio COS/EO—2:1; and flow rate of ethylene oxide—88 cc./mil. A gas chromatographic analysis taken during a 2 hour period showed the presence of 1–2% ethylene sulfide in the effluent gases.

EXAMPLE 15

The apparatus described in Example 1 was charged with 1 gram of lithium phosphate dissolved in 130 grams of tetraethylene glycol dimethyl ether. The procedure of Example 1 was followed with the following reaction parameters: reactant gases—ethylene oxide (EO) and carbonyl sulfide (COS); temperature—200° C.; mole ratio COS/EO—2:1; flow rate of ethylene oxide—88 cc./min. The effluent gases were analyzed by gas chromatograph during the 3½ hour reaction period and showed the presence of an average of 2–3% ethylene sulfide.

EXAMPLE 16

A. Control

The apparatus of Example 1 was charged with 347 grams of tetraethylene glycol dimethyl ether and .755 gram of lithium chloride. The reaction was conducted as in Example 1 with the catalyst bed adjusted to a temperature of 200° C., a carbonyl sulfide (COS) to ethylene oxide (EO) mole ratio of 1.2:1 and an EO flow rate of 320 cc./m. The gas chromatographic analysis of the effluent gases gave the following results:

| Length of experiment (hrs.) | Average mole percent conversion of EO input to ES output | ES/by-product ratio |
|---|---|---|
| 5 | 40 | 14.2 |
| (Reactor was shut down 16 hours overnight) | | |
| 7 | 41 | 2.4 |

B. Addition of hexachlorobenzene

The experiment of part A was repeated with the same apparatus and with all conditions and reactants being identical with those of the experiment of part A except that .801 gram of hexachlorobenzene was added to the catalyst system prior to beginning the experiment. An analysis of the effluent gases gave the following results:

| Length of experiment | Average mole percent conversion of EO input to ES output | ES/by-product ratio |
|---|---|---|
| 4 hrs.[1] | 47 | 18.4 |
| Continued next day, 4 hrs.[1] | 48 | 26 |
| Continued next day, 6 hrs.[1] | 48 | 16.1 |
| Continued next day, 5 hrs | 59 | 12.5 |

[1] At the end of time period for experiment, reactor was shut down overnight.

(NaI comparison—liquid vs. solid catalyst beds)

EXAMPLE 17

A. NaI-tetraethylene glycol dimethyl ether-hexachlorobenzene catalyst system The apparatus described in Example 1 was charged with 130 grams of tetraethylene glycol dimethyl ether, 1 gram of sodium iodide and 1 gram of hexachlorobenzene. The reaction was conducted as in Example 1 with the catalyst bed adjusted to a temperature of 200° C., a COS/EO mole ratio of 2:1, and a flow rate of 88 cc./min. for the input ethylene oxide (EO) gas. The gas chromatographic analysis of the effluent gases gave the following results.

| Time (hrs.) | Percent ES | Percent mole conversion (of EO input to ES output) |
|---|---|---|
| ½ | 22.1 | 49.2 |
| 1 | 21.7 | 56.3 |
| 2 | 23.6 | 54.8 |
| 3 | 20.1 | 40.4 |
| 4 | 21.6 | 53.4 |
| 5 | 21.3 | 55.0 |
| 6 | 22.2 | 51.4 |
| 6½ | 21.3 | 53.3 |

No ethylene sulfide polymer was observed as evidenced by the clear color of the catalyst bed at the end of the run. The catalyst bed showed a weight increase of 9.5 grams at the end of the 6½ hour run (14.6% by-product based on EO input).

B. NaI-solid catalyst bed

An apparatus was set up comprising an electrically heated, glass reactor column equipped with a thermocouple well and a chamber for mixing the reactant gases prior to their being introduced into the column. Flow rate meters were coupled between the gas sources and the chamber for mixing the reactant gases in order to measure the gas reactant flow. A sample take-off was placed in th the column and connected to a gas chromatograph in order to sample and analyze the emerging gases. The column was charged with 62 grams of sodium iodide pellets having a ⅜″ diameter and heated to a temperature of about 200° C. The reactant gases, carbonyl sulfide and ethylene oxide, were introduced into the reactor column in a mole ratio of about 1.2:1 and the flow rate of the reactants adjusted to give the system a space velocity[2] of approximately 166 hours$^{-1}$. The run was continued for 10 hours. The effluent gases as analyzed at various times by gas chromatograph gave the following results:

| Time (hrs.) | Percent ES | Mole percent conversion (of EO input to ES output) |
|---|---|---|
| 1 | 27.15 | 39.10 |
| 2 | 20.34 | 33.54 |
| 3 | 32.73 | 43.46 |
| 6 | 33.91 | 52.22 |
| 10 | 38.75 | 55.36 |

EXAMPLE 18

A. Control

The apparatus of Example 1 was charged with 1 gram of potassium iodide and 100 milligrams of iodine crystals dissolved in 129 grams of tetraethylene glycol dimethyl ether. The reaction was conducted as in Example 1 with the following reaction parameters: temperature—200° C.;

---

[2] Space velocity is defined as the volume of combined reactant gases at standard temperature and pressure V passing through a given volume of catalyst space $V_c$ per unit time $t$. Time is generally expressed in hours. Therefore, space velocity is equal to $$\frac{V}{V_c t}$$

and is expressed in units of $$\frac{\text{(volumes of reactant gases)}}{\text{(volumes of catalyst) (hours)}}$$

or in the abbreviated reciprocal hours, i.e. hours$^{-1}$.

--- reactant gases—ethylene oxide (EO) and carbonyl sulfide (COS); mole ratio (COS/EO)—2:1; flow rate (EO)—88 cc./min. A gas chromatographic analysis of the effluent gases gave the following results:

| Time (hrs.) | Percent $CO_2$ | Percent COS | Percent EO | Percent ES | Mole percent conversion |
|---|---|---|---|---|---|
| 1 | 7.9 | 66.9 | 14.7 | 10.5 | 34.4 |
| 3 | 6.64 | 55.94 | 22.37 | 15.04 | 32.92 |
| 5¾ | 13.12 | 57.72 | 16.32 | 12.83 | 36.53 |

The experiment was allowed to stand over night at room temperature. The liquid bed had a weight increase of 7 grams (13% based in the EO input). No ES polymer was observed in the liquid bed. Next day the experiment was continued after adding an additional 100 mgs. of iodine crystals.

| Time (hrs.) | Percent $CO_2$ | Percent COS | Percent EO | Percent ES | Mole percent conversion |
|---|---|---|---|---|---|
| 7 | 8.90 | 61.60 | 15.90 | 13.50 | 38.30 |
| 9 | 15.20 | 50.70 | 19.30 | 14.80 | 36.00 |
| 11 | 16.10 | 55.20 | 14.90 | 13.80 | 40.50 |

Again the experiment was shut down and allowed to stand over night at room temperature. The liquid bed had a weight increase of 9 gms. (18% based in EO input). This time, traces of white polymer (ES polymer) were observed in the liquid bed.

Next day the experiment was continued, after adding another 100 mgs. of iodine crystals.

| Time (hrs.) | Percent $CO_2$ | Percent COS | Percent EO | Percent ES | Mole percent conversion |
|---|---|---|---|---|---|
| 15 | 19.51 | 48.78 | 14.63 | 17.07 | 46.10 |
| 17 | 14.84 | 54.06 | 14.13 | 16.96 | 46.76 |
| 18 | 24.20 | 54.70 | 12.60 | 8.40 | 32.60 |

Again, the experiment was shut down and allowed to stand over night at room temperature. The liquid bed had a weight increase of 20 gms. (33% based in the ethylene oxide input) with traces of ES polymer in it.

The next day the experiment was continued after adding another 180 mgs. of iodine crystals.

| Time (hrs.) | Percent $CO_2$ | Percent COS | Percent EO | Percent ES | Mole percent conversion |
|---|---|---|---|---|---|
| 19 | 19.48 | 55.84 | 7.79 | 16.88 | 61.35 |
| 22 | 16.40 | 62.30 | 6.80 | 14.60 | 61.20 |
| 24 | 17.20 | 60.50 | 7.60 | 14.90 | 59.20 |

The liquid bed had a weight increase of 22 gms. (36% based in the ethylene oxide input). 5.5 gms. of dithiane were collected from the top part of the reactor where it had formed. Total experimental time was 24 hours. The liquid catalyst bed had a total weight increase of 58 gms. (25% based in the ethylene oxide input).

B. Addition of hexachlorobenzene

The apparatus and procedure of part A was followed with the same reaction parameters except for the addition of hexachlorobenzene. Thus, the apparatus was charged with 129 grams of tetraethylene glycol dimethyl ether, 1 gram of KI and 100 milligrams of iodine crystals, and 200 milligrams of hexachlorobenzene. The reaction parameters were as follows: reactant gases—ethylene oxide (EO) and carbonyl sulfide (COS); temperature—200° C.; mole ratio (COS/EO)—2:1; flow rate (EO)—88 cc./min.

The effluent gases as analyzed by gas chromatograph gave the following results:

| Time (hrs.) | Percent $CO_2$ | Percent COS | Percent EO | Percent ES | Mole percent conversion |
|---|---|---|---|---|---|
| 1 | 5.7 | 62.8 | 22.1 | 9.6 | 24.17 |
| 3 | 8.4 | 57.3 | 21.6 | 10.7 | 26.7 |
| 5 | 9.4 | 58.4 | 19.3 | 12.9 | 32.9 |

The experiment was allowed to stand overnight at room temperature. The liquid phase had a weight increase of 4.4 gms. (7.6% based on the ethylene oxide input). No ethylene sulfide polymer was observed in the liquid phase. The next day the experiment was continued without further addition of hexachlorobenzene, KI or $I_2$.

| Time (hrs.) | Percent $CO_2$ | Percent COS | Percent EO | Percent ES | Mole percent conversion |
|---|---|---|---|---|---|
| 6 | 5.7 | 59.2 | 19.3 | 15.7 | 37.4 |
| 8 | 10.8 | 50.6 | 20.9 | 17.8 | 38.5 |
| 9 | 12.3 | 49.3 | 21.5 | 16.7 | 36.2 |
| 12 | 8.7 | 52.0 | 23.1 | 16.5 | 34.5 |

The liquid phase had a weight increase of 7 gms. (9% based in the ethylene oxide input). No ethylene sulfide polymer was observed in the liquid phase. The experiment was continued for a total of 12 hrs. The liquid phase had a total weight increase of 11.4 gms. (8.5% based in the ethylene oxide input).

C. KI-solid catalyst bed

The apparatus described in Example 17B was charged with a mixture of 72 grams of potassium iodide crystals and 34 grams of Hengar granules (fused alumina, which has some catalytic activity, but which acts primarily as a catalyst support). The reaction was carried out according to the procedure of Example B with the following reaction parameters: temperature of catalyst bed was 200° C.; mole ratio of carbonyl sulfide (COS) to ethylene oxide (EO) was 1.2:1; flow rate of EO was 120 cc./min.; and a space velocity of 212–240 hours$^{-1}$. In a 19 hour run the analysis of the exit gases, by vapor phase chromatograph, gave the following results:

| Time (hrs.) | Percent ES | Mole percent conversion of EO input to ES output |
|---|---|---|
| 2 | 15.93 | 15.15 |
| 7 | 16.26 | 16.20 |
| 16 | 14.97 | 14.80 |
| 19 | 14.23 | 13.97 |

EXAMPLE 19

A. Control

The control experiment was run using as reactant gases, carbonyl sulfide (COS) and ethylene oxide (EO). The catalyst system was made up of 100 milligrams of KOH and 200 milligrams of iodine crystals dissolved in 130 grams of tetraethylene glycol dimethyl ether. The reaction parameters were: temperature 200° C.; mole ratio (COS/EO) 2:1; and flow rate (EO) 88 cc./min.

B. Addition of hexachlorobenzene 300 milligrams of hexachlorobenzene (HCB) were added to a catalyst system prepared for experiment A. Otherwise, the reaction was conducted with identical reactants and reaction parameters as for the control experiment A. The results of the gas chromatographic analysis of the effluent gases in experiments A and B gave the following comparison:

| Time (hrs.) | Percent EO Control | Percent EO With HCB | Percent ES Control | Percent ES With HCB |
|---|---|---|---|---|
| 1 | 26.28 | 24.2 | 10.88 | 10.0 |
| 2 | 18.60 | 26.6 | 11.63 | 12.4 |
| 4 | 19.00 | 24.6 | 9.95 | 12.1 |
| 6 | | 24.9 | | 14.1 |

In the control, after 4 hours, the liquid catalyst system had a weight increase of 7 grams (14% based on the ethylene oxide input) which contained a large amount of polyethylene sulfide polymer as was evidenced by the white color of the final catalyst bed. In contrast the catalyst system in part B with hexachlorobenzene showed a weight increase after 6 hours of only 6 grams (10% based on the ethylene oxide input) and contained little or no polyethylene sulfide polymer as was evidenced by the clear color of the final catalyst bed.

EXAMPLE 20

The apparatus described in Example 1 was charged with 100 milligrams of KOH, 200 milligrams of iodine crystals and 300 milligrams of hexachlorobenzene dissolved in 130 grams of tetraethylene glycol dimethyl ether. Ethylene oxide (EO) was passed through a container containing liquid carbon disulfide ($CS_2$) at room temperature (27° C.). The ethylene oxide inlet tube was about 2½ inches below the surface of the $CS_2$. The mixture of gases ($CS_2$ and EO) was analyzed by gas chromatograph as it came from the container and the mole ratio of $CS_2$ to EO was determined to be 5:1. The reactant gases were then passed into the reaction chamber. The ethylene oxide flow rate was adjusted to a constant rate of 150 cc./min. The temperature of the catalyst bed was maintained at 200° C. The reactor was allowed to run for 3 hours. Analysis by gas chromatograph at the end of 1, 2, and 3 hours showed the presence of 3.91% ethylene sulfide (ES), 3.80% ES, and 3.90% ES respectively in the exit gases. No ethylene sulfide polymer formation was observed in the catalyst bed at the end of the 3 hour run. The liquid catalyst bed had a weight increase of 3 grams (6% based on the EO input).

EXAMPLE 21

The apparatus of Example 1 was modified by attaching to the inlet tube a tube leading to a stainless steel bomb which contained carbon disulfide ($CS_2$). The bomb was wrapped with a heating jacket which was used for applying sufficient heat to vaporise the $CS_2$. The outlet tube of the reaction flask leads to a collection flask which was immersed in a Dry Ice-ammonia bath regulated to a temperature of −79° F. where the effluent gases were collected. At a point about midway between the reaction flask and the collection flask the outlet tube was surrounded by a circulating water jacket which aided in cooling the effluent gases. A take-off tube from the collection flask was attached to a means for regulating the pressure of the reaction system. The reaction flask was charged with 200 grams of polyethylene glycol of a molecular weight of about 400, 160 milligrams of KOH, 320 milligrams of iodine crystals, and 1 gram of hexachlorobenzene. The reactant gases, carbon disulfide ($CS_2$) and ethylene oxide (EO), were passed into the reactor at a mole ratio (EO/$CS_2$) of 4:1. The flow rate of EO was held constant during the reaction at 120 cc./min. The catalyst system was held at a temperature of 150° C. during the course of the experiment. The pressure was maintained at 23 millimeters of mercury. The effluent gases were collected in the collection flask during a 5 hour run. Analysis of the collected effluent gases showed the presence of ethylene sulfide.

EXAMPLE 22

The apparatus of Example 1 was modified by adding to the reaction vessel an outlet tube which leads to a collection flask which was immersed in a Dry Ice-ammonia bath regulated to a temperature of −79° F. At a point about midway between the reaction flask and the collection vessel, the outlet tube was surrounded by a circulating water jacket which aided in cooling the effluent gases. The collection flask was attached to a means for maintaining the pressure of the entire reaction system at a constant pressure of 600 mm. of Hg. The reaction flask was charged with 130 grams of tetraethylene glycol dimethyl ether, 1 gram of NaI and 500 milligrams of hexachlorobenzene. The reactant gases, carbonyl sulfide (COS) and ethylene oxide, were added to the reactor in a mole ratio (COS/EO) of 2:1. The EO flow rate was maintained at 88 cc./min. The temperature of the catalyst system was heated to 200° C. while passing COS at a flow rate of 176 cc./min. EO and COS were then passed into the reaction vessel at a pressure of 600 mm. of Hg. At the end of 5 hours, the effluent gases collected in the collection flask weighed 151.4 grams and showed the presence of 21.5% ethylene sulfide according to gas chromatographic analysis. The catalyst system showed a weight increase of 5.6 grams at the end of the 5 hour run.

We claim:

1. A process for the production of a vicinal episulfide which consists essentially of reacting an alkylene oxide with a sulfur-donor compound selected from the group consisting of carbonyl sulfide and carbon disulfide by passing a gaseous reaction mixture of the alkylene oxide and the sulfur-donor compound, in which the mole ratio of ethylene oxide to the sulfur-donor compound is in the range from about 0.2:1 to about 10:1, at a temperature in the range from about 100° C. to about 300° C., through an inert liquid organic solvent in which there is dissolved (a) a catalytic amount of a Lewis base and (b) an effective amount of a polymerization inhibitor selected from the group consisting of halogens, halogenated alkanes, halogenated alkenes, halogenated alkynes, halogenated aldehydes, halogenated ketones and carboxylic acid halides, thereby forming the corresponding vicinal episulfide in high yield while reducing the tendency of the resultant vicinal episulfide to undergo polymerization.

2. The process according to claim 1, in which the sulfur-donor compound is carbonyl sulfide.

3. The process according to claim 1, in which the sulfur-donor compound is carbonyl sulfide.

4. The process according to claim 1, in which the alkylene oxide is ethylene oxide.

5. The process according to claim 1, in which the alkylene oxide is propylene oxide.

6. The process according to claim 1, in which the catalytic amount of the Lewis base dissolved in the organic solvent is selected from the group consisting of (i) Lewis bases selected from Groups I–A, II–A, III–A, IV–B and VIII metal halides, (ii) Lewis bases selected from Groups I–A, II–A, III–A, IV–A and VIII metal oxides, (iii) Lewis bases selected from Groups I–A, II–A, III–A, II–B and VIII metal hydroxides, (iv) Lewis bases selected from Groups I–A, II–A and III–A metal salts of carboxylic acids, (v) Lewis bases selected from Groups I–A, II–A and III–A metal phosphates, borates, cyanates, thiocyanates, fluosilicates, iodates, molybdates, thiosulfates, cyanides, silicates, titanates, aluminates, stannates, sulfides, and tungstates, (vi) Lewis bases selected from Groups I–A, II–A and III–A metal salts of carbonic and thiocarbonic acids and their alkyl esters, (vii) alkyl amines, and (viii) quaternary ammonium salts.

7. The process according to claim 1, in which the catalytic amount of the Lewis base dissolved in the organic solvent is selected from Groups I–A, II–A, III–A, IV–B and VIII metal halides.

8. The process according to claim 7, in which the catalyst is sodium fluoride.

9. The process according to claim 7, in which the catalyst is sodium iodide.

10. The process according to claim 7, in which the catalyst is potassium iodide.

11. The process according to claim 7, in which the catalyst is lithium chloride.

12. The process according to claim 7, in which the inert organic solvent which contains the catalytic amount of the Lewis base also contains an effective amount of hexachlorobenzene to reduce the tendency of the resultant vicinal episulfide to undergo polymerization.

13. The process for the production of ethylene sulfide which consists essentially of reacting ethylene oxide with a sulfur-donor compound selected from the group consisting of carbonyl sulfide and carbon disulfide by passing a gaseous reaction mixture of ethylene oxide and the sulfur-donor compound, in which the mole ratio of ethylene oxide to the sulfur-donor compound is in the range from about 0.2:1 to about 10:1, at a temperature in the range from about 100° C. to about 300°C., through an inert liquid organic solvent in which there is dissolved (a) a catalytic amount of a Lewis base selected from Groups I–A, II–A, III–A, IV–B and VIII metal halides and (b) an effective amount of hexachlorobenzene, thereby forming ethylene sulfide in high yield while reducing the tendency of the ethylene sulfide to undergo polymerization.

References Cited

UNITED STATES PATENTS

| | | | |
|---|---|---|---|
| 3,073,846 | 1/1963 | Millikan | 260—327 |
| 3,213,108 | 10/1965 | Osborn et al. | 260—327 |
| 3,282,960 | 11/1966 | Broderick et al. | 260—327 |
| 3,347,867 | 10/1967 | Osborn et al. | 260—327 |

OTHER REFERENCES

Durden et al.: J. Org. Chem., vol. 26, No. 3 (1961), pp. 836–9.

JAMES A. PATTEN, Primary Examiner

U.S. Cl. X.R.

260—79.7